United States Patent [19]

Wekhof

[11] Patent Number: 5,124,131
[45] Date of Patent: Jun. 23, 1992

[54] COMPACT HIGH-THROUGHPUT ULTRAVIOLET PROCESSING CHAMBER

[75] Inventor: Alexander Wekhof, Emeryville, Calif.

[73] Assignee: Ultraviolet Energy Generators, Inc., Berkeley, Calif.

[21] Appl. No.: 626,120

[22] Filed: Dec. 10, 1990

[51] Int. Cl.$^5$ .............................................. B01J 19/08
[52] U.S. Cl. .................................. 422/186.3; 422/24
[58] Field of Search .............. 422/186, 186.04, 186.07, 422/186.11, 186.14, 186.18, 186.19, 186.2, 186.3, 24

[56] References Cited

U.S. PATENT DOCUMENTS

| | | | |
|---|---|---|---|
| 3,174,819 | 3/1965 | Clayton | 422/186.3 |
| 4,043,886 | 8/1977 | Bierker et al. | 204/157.1 R |
| 4,045,316 | 8/1977 | Legan | 204/158 R |
| 4,179,616 | 12/1979 | Coviello et al. | 250/527 |
| 4,189,363 | 2/1980 | Beitzel | 204/157.1 R |
| 4,952,376 | 8/1990 | Peterson | 422/186.3 |

Primary Examiner—Brooks H. Hunt
Assistant Examiner—Daniel J. Jenkins
Attorney, Agent, or Firm—Townsend and Townend

[57] ABSTRACT

An ultraviolet processing chamber for treating contaminated waste water and the like. The processing chamber includes a chamber body defining a passageway through which the water under treatment flows. An enclosed volume is defined which contains an array of linear UV lamps and which includes a protective wall formed of a material substantially transparent to UV radiation. The protective wall is disposed with respect to the flow passageway so as to permit UV radiation to pass in substantial amounts into the flow passageway to irradiate the water or other substance under treatment. For ease of maintenance the array of UV lamps is contained in a module which is removable from the remainder of the processing chamber. More specifically, the lamps are mounted on a base portion, which may be secured in position on the chamber, and the plurality of lamps forming the array extend into the enclosed volume separated from the substance under treatment by the protective wall. Another assembly receives the ends of the lamps opposite the base portion. The base portion and the receiving assembly are formed to be in flow communication with the enclosed volume to permit circulation of coolant about the lamps within the enclosed volume to cool the lamps. Disposed within the passageway are a plurality of flow diverters, which direct the water under treatemnt to peripheral regions of the chamber passageway and to regions of the passageway proximate to the enclosed volume of higher UV intensity.

16 Claims, 3 Drawing Sheets

COMPACT HIGH-THROUGHPUT ULTRAVIOLET PROCESSING CHAMBER

BACKGROUND OF THE INVENTION

The present invention relates to the high-volume treatment of waste water or other aqueous (or gaseous) environments with ultraviolet radiation for the destruction of toxic organic compounds, microbial species, and the like.

Various undesirable substances, such as heavy organic molecular compounds and microbial species, are often carried in waste water or other effluents, or in gaseous or other matrix environments, in which they may prove toxic in subsequent uses of the carrier material.

One known process for sterilizing or disinfecting the carriers of these compounds is through irradiation with ultraviolet (UV) radiation.

For treatment of waste water, for example, the water under treatment is mixed with ozone or peroxide and subsequently passed through a processing chamber where it is irradiated by a UV source typically in the form of one or more UV lamps as the water flows past. The most common form of lamp employed in such chambers has historically been the low-pressure linear mercury lamp. Recently much more powerful medium-pressure linear mercury lamps have been introduced. For the most part, however, these lamps have merely been used in place of the low-pressure lamps in processing chambers of conventional design intended for low-pressure lamps, and only limited attempts have been made to redesign the processing chamber to accommodate the medium-pressure lamps. Thus, known processing chamber designs for use with medium-pressure lamps share many characteristics—both positive and negative—in common with chambers for low-pressure lamps.

The conventional UV processing chambers are subject to a number of deficiencies and drawbacks. The commonly employed low-pressure mercury lamps have a low power output in the deep UV region. Their radiation is used to create free radicals by photolytic action with ozone or peroxide, which in turn destroys toxic substances. Because of the low power of such lamps, however, the water has to travel relatively slowly through the processing chamber so that the travel time of the water through the operative portion of the chamber is often comparable to the diffusion time for contaminants through the water. As a result, contaminants in the water may foul the UV lamps and produce significant screening of the UV radiation. To solve this problem in the past, special devices have been used to scrub the buildup from the lamps while the lamps are operating, or water was continually mixed by propellers in the chamber, or else it has been necessary to shut the system down periodically to permit the lamps to be cleaned.

To treat large volumes of water such as required in any industrial treatment facility, a matrix type array of such UV lamps is used, where each lamp of the array is immersed in the water under treatment. For large industrial systems as many as 200 low-pressure mercury lamps may be used. As a result, such systems tend to be bulky and may be so massive as to require a special concrete base to support the aggregate weight of the chamber and processed water, which can reach ten or more tons.

The trend in the water treatment industry is now to switch to medium-pressure lamps instead of low-pressure ones. The power of the medium-pressure lamps exceeds the power of low-pressure lamps by a factor of about 100 to 150. More specifically, the medium-pressure lamps have a typical power rating of 200 to 250 watts per inch of lamp length and may be as high as 300 watts per inch. This is to be compared with a maximum of two watts per inch found in low-pressure mercury lamps. Thus, the number of lamps in systems of comparable throughput is reduced significantly. The medium-pressure lamps, however, also generate significantly more heat (about 50 percent of their output). Hence, these lamps have to be cooled. The use of these lamps is not yet widespread. When medium-pressure lamps are used, however, they are usually also disposed in arrays in conventional chambers as are the low-pressure lamps. Such systems are desired for processing large volumes of water (100 gallons per minute or more). Alternatively, a design is sometimes used which is especially adapted for medium-pressure lamps and high-volume processing, in which a plurality of long medium-pressure lamps, up to seven feet in length, are each contained in a cylindrical chamber, and the power for each such module can attain about 15 kilowatts.

Although the use of medium-pressure mercury lamps eliminates some of the drawbacks of systems with low-pressure linear mercury lamps, such as their bulky size and excessive weight, other drawbacks of conventional UV treatment systems were merely carried over into systems with linear medium-pressure mercury lamps. Specifically, the medium-pressure lamp systems still employ unnecessarily complex matrix arrays for the lamp geometries and still require the whole system to be drained for replacement of each individual lamp.

In fact, with the arrays of either the low-pressure or medium-pressure lamps, when a lamp must be replaced or cleaned, the whole system must be shut down and drained. This occurs on a periodic basis because lamp lifetime is well known and premature burnout is statistically insignificant. At that time the system is drained and the lamps are individually replaced, which is a tedious and time-consuming procedure.

Thus, matrix arrays of lamps present two main drawbacks, notwithstanding their benefits. The fact remains that despite the known reliability of standard lamps, failures can occur due to such extraneous factors as improper cooling or electrical failure. In this case the action of the failed lamp in the array of lamps is not covered by the remaining lamps because in such systems the lamps are positioned to treat predetermined portions of the processing chamber. The UV radiation from the other lamps will not generally reach a particular portion of the chamber with sufficient intensity to substitute for a failed lamp. As a result, when a lamp fails, not all the water will be treated effectively if the system is permitted to continue operating. To guard against this, many systems have automatic controls which shut down the system when a failure in lamp performance is detected so as to prevent an outflow of untreated water.

Another drawback of the standard lamp array geometry is the non-uniform distribution of radiation intensity in the processing chamber, which results from the lamps' complicated overlapping circles of action needed to insure that even the farthest reaches of the volumes allocated to the individual lamps are subjected at least to the minimum operative UV levels. Such an arrangement undesirably produces "pockets" of excess UV exposure mostly within close distances to the lamps, which results in an overall waste of UV energy, which may be as high as 30 percent.

In some known systems the "pocket" effect is compensated somewhat by intensive mixing of the water under treatment so that portions of the water pass both through areas of higher and lower UV exposure, which enables one to decrease the UV intensities of the lamps (or to increase the throughput of treated water). Although the overall utilization of UV energy is improved in such case, in a chamber with complicated geometry and in a chamber with a low speed of processed water through the chamber, the proper mixing of water is difficult to maintain throughout the chamber. Thus, this approach is not in widespread use, and usually the underutilization of UV in such systems is simply accepted.

SUMMARY OF THE INVENTION

The present invention provides an especially compact and lightweight processing chamber for use with powerful linear flashlamps or with medium-pressure linear mercury lamps, which overcomes many of the aforementioned disadvantages and tradeoffs of known processing chambers. The processing chamber according to the invention takes advantage of powerful linear flashlamps having a typical length from 6 to 12 inches and total power output in all spectral regions from about 50 to 300 watts/inch of lamp length while avoiding common drawbacks of conventional UV processing chambers used with low-pressure or medium-pressure linear mercury lamps. The chamber design may be used with flashlamps or other linear lamps as well.

Briefly, a processing chamber according to the invention includes a chamber body defining a passageway through which the water under treatment flows. An enclosed volume is defined which contains an array of linear UV lamps and which includes a protective wall formed of a material substantially transparent to UV radiation. The protective wall is disposed with respect to the flow passageway so as to permit UV radiation to pass in substantial amounts into the flow passageway to irradiate the water or other substance under treatment. For ease of maintenance the array of UV lamps is contained in a module which is removable from the remainder of the processing chamber. More specifically, the lamps are mounted on a base portion, which may be secured in position on the chamber, and the plurality of lamps forming the array extend into the enclosed volume separated from the substance under treatment by the protective wall. Another assembly receives the ends of the lamps opposite the base portion. The base portion and the receiving assembly are formed to be in flow communication with the enclosed volume to permit circulation of coolant about the lamps within the enclosed volume to cool the lamps. Disposed within the passageway are a plurality of flow diverters, which direct the water under treatment to regions of the chamber passageway with different UV exposures for the purpose of equalizing the exposure.

In a particularly compact and effective embodiment of the invention, the enclosed volume is defined by a plurality of protective lamp shells, which may have a generally cylindrical form extending transversely through the central region of the flow passageway. Each individual lamp of the lamp array extends through its own cylindrical lamp shell, and coolant flows through each individual shell to cool the lamp within.

Other aspects, advantages, and novel features of the invention are described below or will be readily apparent to those skilled in the art from the following specifications and drawings of an illustrative embodiment.

DESCRIPTION OF THE PREFERRED EMBODIMENT

Figure 1:
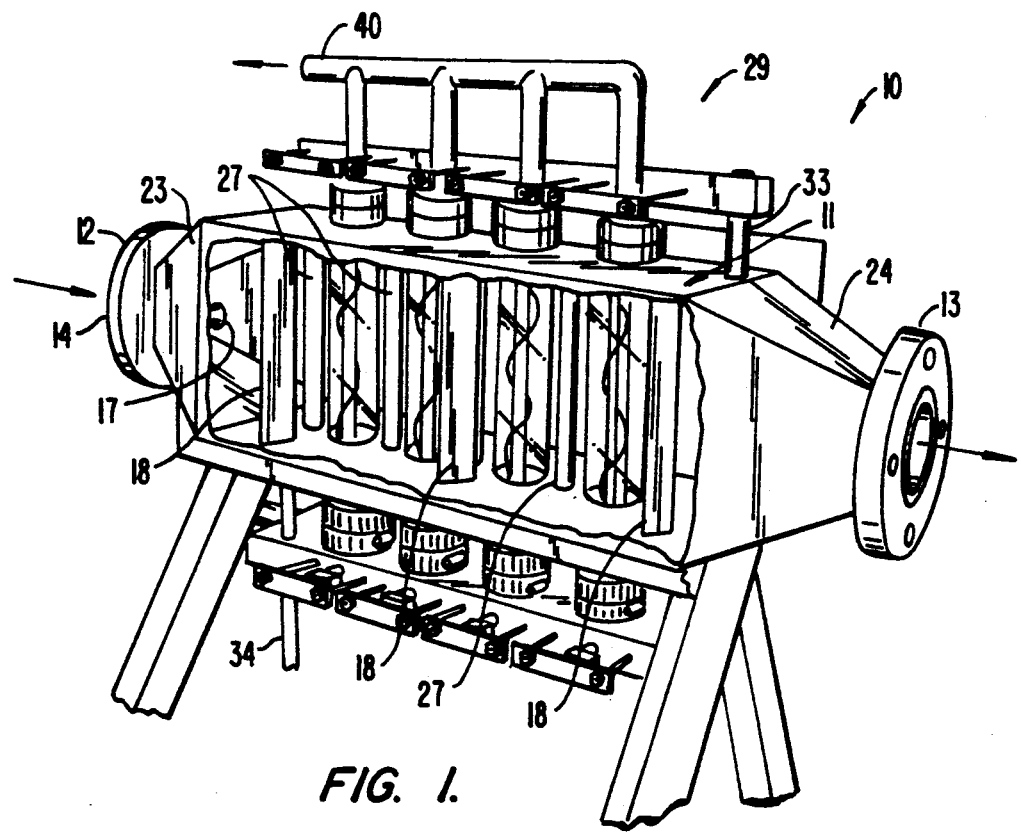
FIG. 1 is a cut-away perspective view of a processing chamber according to the invention.
Figure 2:
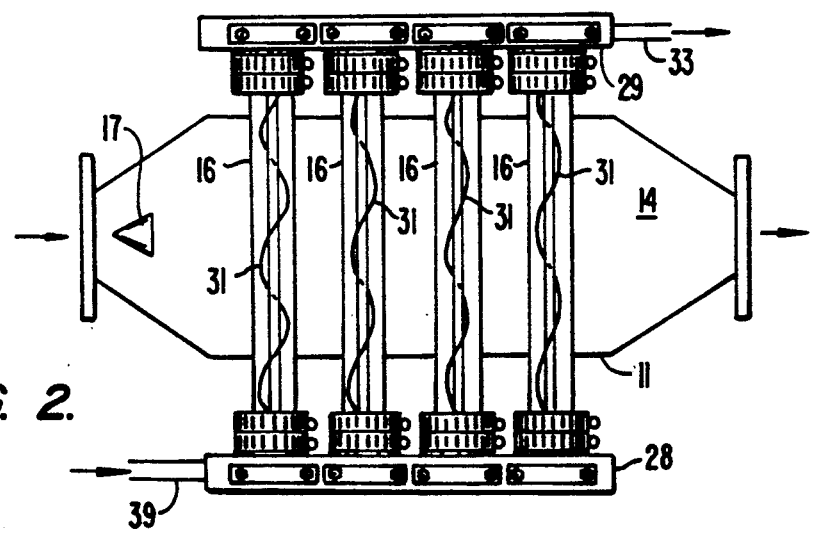
FIG. 2 is a simplified side cross-sectional view of the chamber of FIG. 1.

FIG. 1 shows an overall perspective view of an illustrative processing chamber, generally designated by reference numeral 10, according to the invention. Processing chamber 10 includes a chamber body 11, which includes an inlet port 12 and an outlet port 13. Chamber body 11 defines an internal passageway 14 communicating with inlet and outlet ports 12 and 13 through which the water under treatment flows. FIG. 1 has been partially cut away to reveal the insides of the chamber. Running vertically through the chamber body are a plurality of generally cylindrical protective shells 16 arranged in a linear fashion along passageway 14. Although illustrated herein as running vertically, it will be apparent from the descriptions below that the shells may also be configured to run horizontally or at other dispositions. The shells are of such a shape and dimension that each may conveniently receive the envelope of a UV lamp. The shells are formed of a material such as quartz which is transparent to UV radiation. Positioned within the chamber passageway 14 are a plurality of flow diverters 17 and 18, which serve to divert the flow of water under treatment in a manner described below. A plurality of UV lamps 19 are mounted in a removable cassette module 21 and are disposed within shells 16.

Figure 4:
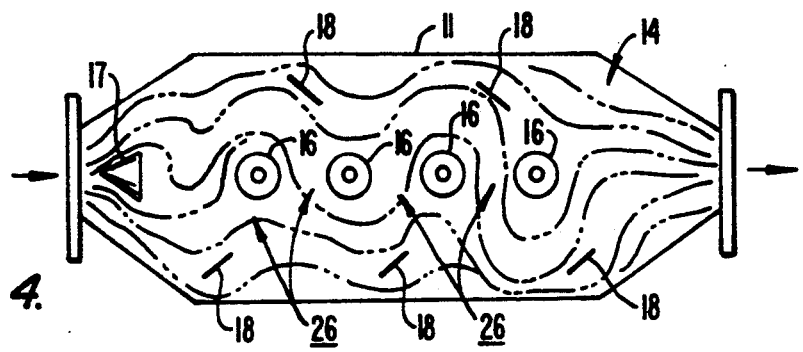
FIG. 4 is a simplified top cross-sectional view of the chamber of FIG. 1 showing the flow path of the water under treatment.

As illustrated here the main portion of the processing chamber 11 has a square cross section, and the lamp shells 16 are spaced equidistant from one another in a linear array along the central longitudinal axis of the chamber. Chamber 11 is provided with entrance and exit funnels 23 and 24 connecting the inlet and outlet ports with the main walls of chamber body 11. Positioned in entrance funnel 23 at the inlet port is flow diverter 17, which is provided by a generally conical member and which serves to spread the incoming flow as it enters the main part of chamber 11. To establish a flow of water through passageway 14 in a manner that maximizes the utilization of the UV radiation emitted by the centrally disposed lamps, a plurality of flow diverters 18 are positioned in the vicinity of the chamber sidewalls. Without such diverters, the water flow in the peripheral regions of passageway 14 will generally be of higher speed and will pass more quickly through the chamber than the flow in the central region of the chamber, and consequently will be underexposed. The lamps in the central region of the chamber present a hydraulic resistance to the flow so that the water here will move more slowly than in the free peripheral regions, absent the diverters, and the water will tend to be overexposed. The purpose of the flow diverters is to direct the peripheral and generally faster portion of the flow to the regions, designated at reference numeral 26 in FIG. 4, proximate to and between the linearly arranged UV lamp shells 16 where the UV light is of maximum intensity. Without the flow diverters to "redistribute" the flow, the regions between the lamps would develop "pockets" of slow-moving water, which would be overexposed, while the peripheral streams of water would run through more quickly and would tend to be underexposed. Notwithstanding this retarding action, the linear lamp array is desirable for other reasons discussed below, and the flow diverters enable one to take full advantage of the linear array. The precise positioning of flow diverters 18 may vary from embodiment to embodiment, but in any case may readily be established by those skilled in the art to achieve the desired flow path. For example, for the configuration illustrated here diverters 18 are provided by rectangular strips positioned along, but spaced apart from, the sidewalls as shown in FIG. 4. Diverters 18 extend the full vertical height of the chamber and are angled at about 45 degrees to the direction of the water flow. It may also be advantageous to vary the angle of the diverters according to the flow rate. The optimal diverter angle and water passage parameters in any given chamber configuration as a function of flow rate may readily be determined empirically by those of ordinary skill in the art. The precise size of the conical member forming diverter 17 and its positioning in entrance funnel 23 may also be selected empirically so as to cooperate with flow diverters 18.

The illustrated geometry for the processing chamber is particularly compact and effective. For example, an efficient chamber may be formed with the following dimensions: a square chamber cross section of 7 inches (roughly 18 centimeters) on a side; four UV lamps spaced apart from one another by 3.5 inches (9 centimeters); inlet and outlet ports with a 2-inch (5-centimeter) inside diameter; an overall length from inlet port to outlet port of 30 inches (76 centimeters); diverter 17 of conical shape; and diverters 18 in the form of rectangular strips about 1 inch wide (2.5 centimeters) and running the vertical height of the passageway. With these dimensions and with UV lamps having a power rating of about 200 Watts per inch of lamp length, the chamber of the present invention is able to treat on the order of 10 to 100 gallons per minute of toxic effluent, depending on effluent initial concentration and degree of desired decontamination.

To illustrate the processing efficiency of this embodiment specifically in cases where only minimal UV exposures are called for, which is the case for water disinfection where the exposure of 30 milliwatts per cubic centimeter of water under treatment is sufficient, the above-described configuration of the processing chamber with the same lamps can treat up to 3000 gallons per minute, and the flow may attain a speed of 3 meters per second. At these processing speeds and volumes the lamp's cooling shells and seals in the above configuration may experience a high hydrodynamic pressure which presently available commercial seals and lamp's shells will not withstand. For such cases an alternative configuration is preferred, in which the lamps are all positioned along one sidewall behind a common quartz window of a rectangular shape corresponding to the shape of the adjacent sidewall. This embodiment requires a different cassette module for mounting the lamps and achieves a lesser utilization of the UV output. To compensate for the reduced UV utilization, it is desirable to provide a UV mirror on the side wall behind the lamps to reflect a greater portion of the UV radiation into the processing chamber passageway. Although not as efficient as the embodiment of FIG. 1, such an embodiment is nevertheless useful in cases such as certain UV disinfection applications, in which a lower UV exposure will suffice.

The arrangement of the UV lamps as illustrated herein achieves an optical coupling of the lamps, which provides for minimal nonuniformity of the UV radiation within the processing chamber. The lamps are disposed along the processing chamber center line with a separation between adjacent lamp centers equal to the distance between the center line and the neighboring, i.e., parallel, sidewall of the chamber. (In the embodiment in which the lamps are disposed behind a quartz window along one sidewall, the distance between the lamp centers is equal to the distance to the opposite sidewall.) The magnitude of that distance to the neighboring sidewall is preferably selected as the distance from the lamps at which the UV losses in the water under treatment reach about 70 percent.

The sidewalls opposite the lamp array may advantageously be provided with a UV-reflective surface to enhance the intensity of the UV radiation in the vicinity of the sidewalls. For example, for use in processing water a UV-reflective surface yielding about 50-percent reflection in the deep UV region may be provided by polished stainless steel coated with chrome. A better, although more expensive, reflective surface in the deep UV range may be achieved with aluminum coated with magnesium fluoride ($Al+MgF_2$) which is in turn coated with a coating such as TEFLON to prevent dissolution or degradation of the ($MgF_2+Al$) mirror. With this arrangement reflections in the deep UV range can reach as high as 80 percent.

It should be apparent that uniform UV irradiation of the water throughout the processing chamber as it is presented in FIG. 1 (with a lamp array along the chamber center) cannot be achieved through the optical design of the lamp illumination pattern in and of itself. In the present invention the uniformity of UV irradiation is enhanced by the mixing produced by the flow diverters, which compensates appreciably for the nonuniformities inherent in the lamp illumination pattern. Irregularities in the lamp illumination pattern are also smoothed out in the illustrated embodiment by the positioning of feedthroughs for the electrical cabling associated with the lamps. A maximum intensity of UV radiation in the lamp illumination pattern will lie in the spots between two adjacent lamps. Feedthroughs 27 in the form of vertical tubes (diameter of 0.5 inch), which carry return high voltage wires from the bottom of the processing chamber to the top, are located at the positions of maximum UV radiation intensity. See FIGS. 1 and 4. This reduces overexposure and at the same time assures a well balanced electrical circuit with a low impedance and balanced electromagnetic plasma action in the lamps. Thus the spots of the maximum UV intensity are utilized in the chamber for necessary electrical hardware while some broader areas of elevated UV intensity in UV circles overlapping from adjacent two lamps accommodate a higher than average water flow due to the actions of the diverters.

Another advantage of the linear array of lamps is the ability to cover the action of a failed lamp through increased action of the remaining lamps without shutting down the whole system. This is apparent from the illustrated embodiment, in which the water under treatment necessarily flows through the region treated by each lamp. In this way if a lamp should burn out and the processing chamber be permitted to continue operating, all portions of the flow of water will still be exposed to the appropriate intensity of UV radiation, although the duration of the exposure will of course be diminished. This is to be contrasted with known matrix arrays of UV lamps for treating comparable volumes of water at comparable rates. In such arrays each lamp is assigned to the treatment of a designated subvolume of water. If a lamp should fail, then some of the water in the subvolume associated with that lamp will simply fail to be exposed to UV radiation of the desired intensity.

Figure 5:
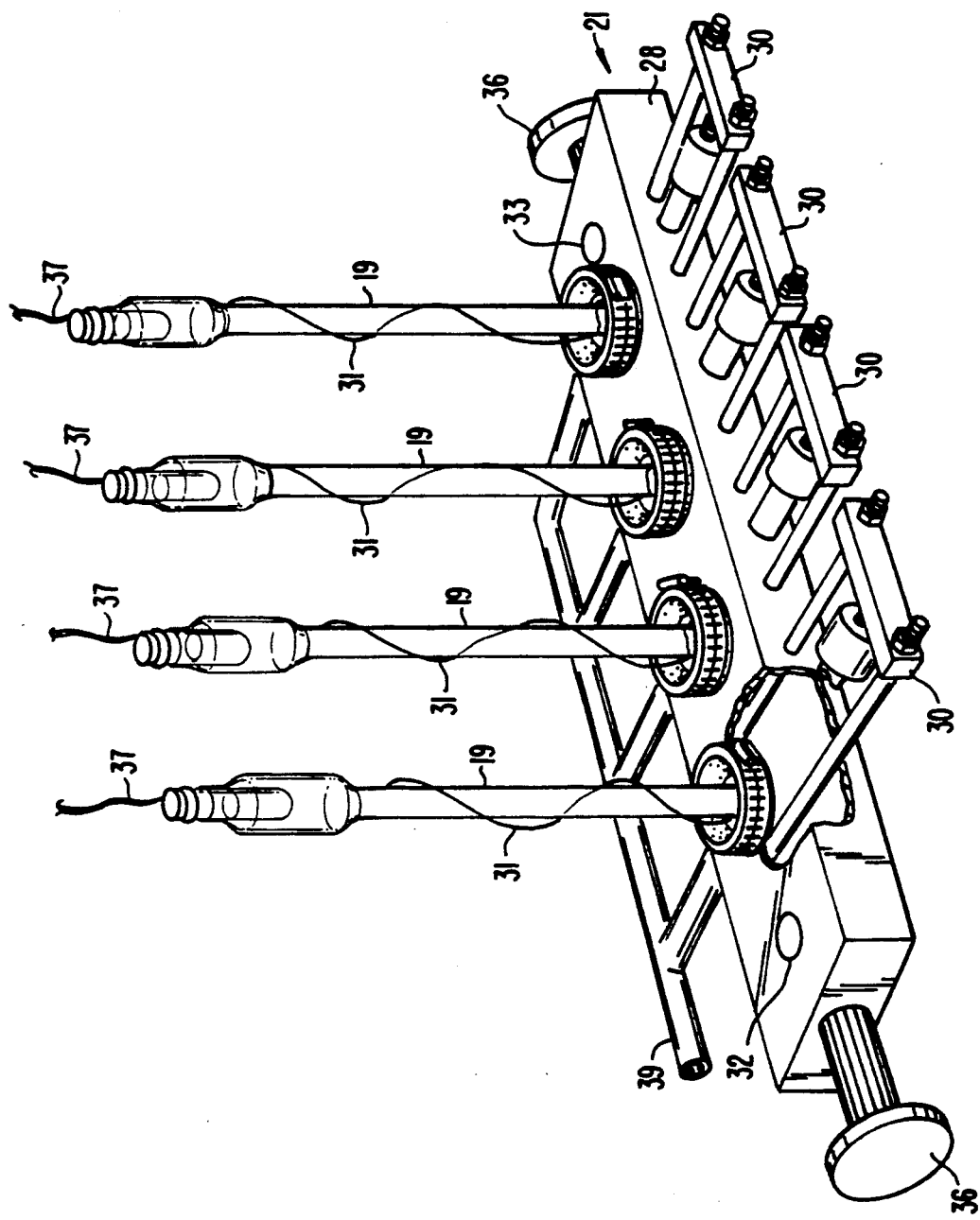
FIG. 5 is a perspective view of a cassette module with a lamp array for use with the chamber of FIG. 1.
Figure 3:
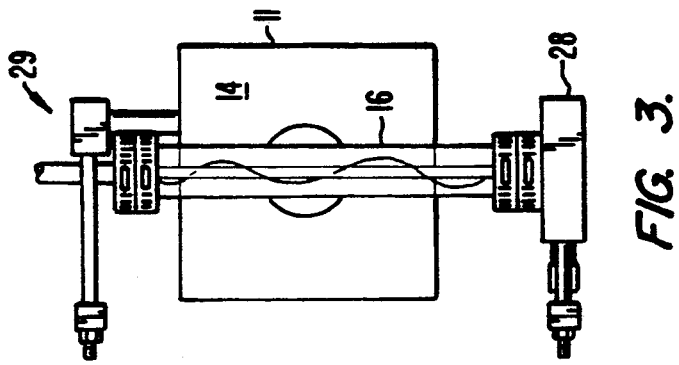
FIG. 3 is a simplified end cross-sectional view of the chamber of FIG. 1.

Yet another advantage of the present design is the easy replacement of all the lamps by means of a replaceable lamp cartridge. As illustrated here the UV lamps are mounted in the processing chamber by means of a removable cartridge or cassette module designated generally by reference numeral 21 in FIG. 5. Module 21 includes a base portion 28 for holding lamps 19. Each lamp 19 is secured in an appropriate socket in base portion 28 and provided with electrical connections for the lamp's ground and ignition wire. In the FIG. 5 the ground connection is shown at 30 and ignition wires 31 are fed through the base portion 28. Surrounding each lamp socket and mounted on the base portion is a coupling member and seal, which makes sealing contact with an entrance aperture at the lower extremity of the associated shell 16 in the chamber body. As illustrated in FIG. 5, the seal is provided by a deformable gasket and surrounding hose clamp which are mounted over a flange protruding from the bottom of the chamber body at the entrance aperture of each shell. Other suitable seals and clamps for accomplishing this purpose are well known to those skilled in the art and need not be described here in any detail.

To guide the lamp module into position on the chamber body, base portion 28 is formed with two guide holes 32 and 33, and the chamber is provided with a pair of guide shafts in registration with the guide holes of the base portion. (Only one such guide shaft 34 is visible in FIG. 1.) In the illustrated embodiment the lamp module is held in position by turn screws 36. Other conventional means may also be used and other custom configurations may also be devised for removably holding the lamp module in position on the chamber. These are well within the ordinary skill in the art and need not be described here.

When module 21 is mounted on the chamber body, lamps 19 extend through shells 16 to a receiving assembly 29 on chamber body 11, which receives the upper extremities of the lamps. The lamps may be formed with the upper extremity terminating in a flexible wire 37 of typically 14 or 16 gauge which serves as the power connection to the upper lamp electrode, which will generally be the anode. Terminating wires 37 are secured in appropriate sockets in receiving assembly 29 and serve to provide the mounting connection to the receiving assembly and the requisite high-voltage connections for the lamps. Forming the receiving connections for the lamps from the flexible wires in this manner is highly desirable in that, unlike conventional clamping sockets, no stress is introduced on the lamp at the upper extremity by the receiving assembly. As illustrated in FIG. 1, the chamber is provided with feedthroughs 27 by each lamp shell to bring the high voltage electrical power lines for each lamp to the underside of the chamber. This serves to simplify the electrical cabling, to maintain a low impedance for the lamp circuits, and to balance the lamp plasma within the center of the lamp bore. This is accomplished through stainless steel tubes roughly 0.5 inches in diameter, which do not occupy much of the valuable space between lamps and, as explained above, are advantageously positioned in spots of maximum UV intensity so as to prevent overexposure at these spots. Other arrangements could, of course, be used as well.

The high-voltage connections are preferably made in this manner separately for each lamp and are fixed in receiving assembly 29 and hence in the processing chamber. Receiving assembly 29 may also include seals as needed to produce a water-tight seal with shells 16.

As in any high-power lamp system, the processing chamber also includes a lamp cooling system. The base portion 28 is formed with an internal coolant passage leading to each lamp, which is provided with a coolant port for connection to tubing 39 for carrying the coolant. Corresponding coolant outlet ports are provided at the top of the chamber by each shell as part of receiving assembly 29 for connection to tubing 40, as shown in FIG. 1. The coolant enters the system through inlet tubing 39 and travels through the coolant flow passageways formed in base portion 28 to shells 16. The diameter of the shells is sufficiently greater than that of the lamps to permit sufficient coolant to flow past the lamps to maintain the lamps at their recommended operating temperature. The gap between a shell 16 and its enclosed lamp communicates with the corresponding coolant outlet port in receiving assembly 29. The coolant circulates through coolant outlet tubing 40.

This arrangement eliminates several problems. To remove lamps, the cassette module 21 may be removed without having to shut down the system. A new cartridge with new lamps can be readily mounted in place of the removed cartridge making lamp replacement quick and easy. The lamps may be pre-mounted on the cassette cartridges at the time of manufacture and may simply be replaced as a unit so that the system experiences little down time and the user spends little time on maintenance. Spent lamp cartridges may be returned to the manufacturing facility for repair and recycling. Note that the lamp cooling is independent of the water under treatment because of the closed cooling system. The flow rate of the coolant is independent of the flow rate of the water under treatment and may thus be adjusted to optimize the lamp cooling. The coolant may be kept relatively free of contaminants, thus greatly reducing fouling of the lamp envelopes.

Fouling of the lamp shells may be reduced through the self-cleaning effect of an elevated flow rate through the chamber. It has been demonstrated with this design that at greater water speeds on the order of 20 centimeters per second or above fouling does not occur due to the self-cleaning action of the fast-moving water. The present invention, especially in the case when the lamp module is placed along the side wall, includes such self-cleaning action as an added benefit when the UV exposure time is small and consequently the water flow is high, i.e. above 20 cm per sec. However, when processing highly contaminated waste water, the water flow may fall in the range of a few centimeters per second even with the highest available lamp UV power (200 watts per inch).

Figure 6:
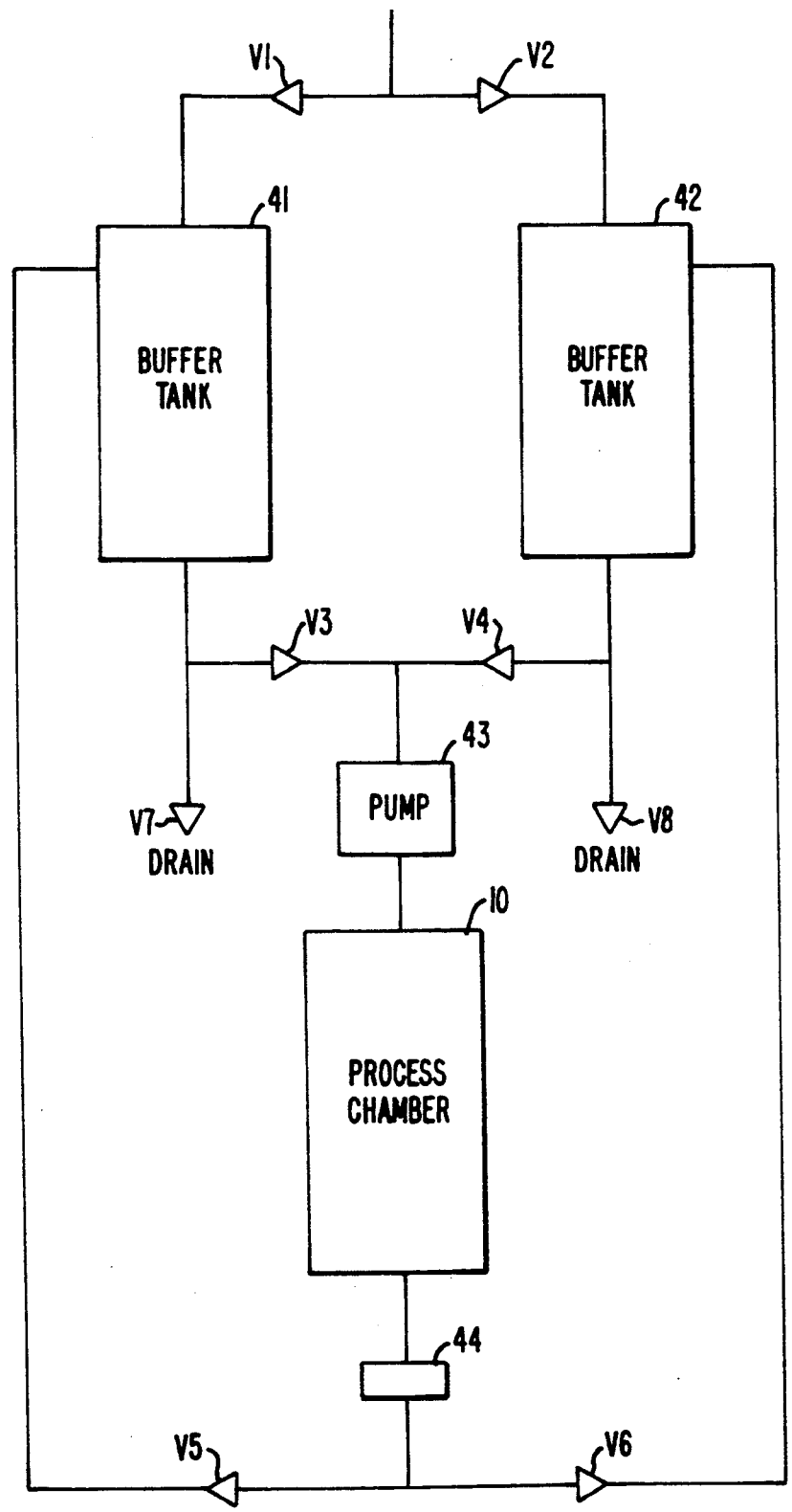
FIG. 6 is a block diagram of self-cleaning processing system according to the invention including buffer storage tanks for recirculation.

To maintain the self-cleaning action in the processing chamber regardless of UV exposure conditions, the present invention provides two optional water storage tanks, each of the same size as the processing chamber (about 4 Gallons in the illustrated embodiment). The small size of the processing chamber and storage tanks makes for a compact overall system. This arrangement is shown in FIG. 6, which includes processing chamber 10 and first and second buffer storage tanks 41 and 42. The flow through the system is controlled by water valves V1, V2, V3 and V4. When valve V1 is closed, valve V2 is open and the waste water fills the tank 42. Tank 41 is already filled from the previous cycle in which valve V1 was open and valve V2 was closed. While tank 42 is filling, valve V3 from tank 41 is open and allows water to be pumped through processing chamber 10 by water pump 43. The water passes through filter 44 and through the open valve V5 into the tank 41 while valve V6 on this return line is closed. The processing cycle for buffer chamber 42 starts when valves V4 and V6 open (automatically) and pump 43 starts circulating water from this tank through processing chamber 10. These cycles alternate automatically one after another to assure an uninterrupted flow of water through the whole system. The water may be recirculated as many times as needed to reach the desired amount of UV exposure. One tank is filled at the projected water flow rate for the system, while the second tank, which was already filled in the previous cycle, is used for the water circulation from this tank to the processing chamber. This circulation is supported by a backup water pump, so that water can move through the chamber at a constant rate regardless of the water flow on the line. The flow rate is adjusted to be high enough to support the self-cleaning action by the circulating water so as to prevent fouling. The return lines between the processing chamber and the buffer tanks may also include a filter for collecting accumulated byproducts washed from the quartz and mirror surfaces within the chamber.

When the water has been recirculated the desired number of times, the purified water is drained from the buffer tanks 41 and 42. The water in tank 41 is released through output valve V7 under the action of gravity or by a second pump on the output line if a gravity flow is not sufficient. During this time valves V1 and V3 are closed to prevent mixing of treated water with untreated water. Draining of such a compact buffer chamber (4 Gallons) does not take more than about 15 seconds using standard two-inch pipes and valves. The drain valves V7 and V8, of course, are always closed except when draining the associated tank 41 or 42. It is clear from the above description that the recirculation of waste water through the buffer tank does not slow down the overall system throughput. In fact, the throughput remains the same as if water would move only through the processing chamber at the original low speed. The implementation of hydraulic apparatus according to the above descriptions is well within the ordinary skill in the art and need not be described here in further detail.

The above provides a description of an illustrative embodiment of the invention. Given the benefit of this description, various modifications and alternate configurations will occur to those skilled in the art, not all of which can be conveniently described herein. For example, those skilled in the art will appreciate from the above descriptions that arrangements of this processing chamber can also be used for treatment of contaminated air as well with little or no modifications or adjustments. This is due to the similar hydrodynamic nature of air and water and due to similar action of UV on undesirable organic waste or bacterial species in either environment.

Accordingly, the invention is not intended to be limited only to the specific examples and embodiments disclosed herein, but is defined by the appended claims.

What is claimed is:

1. A compact processing chamber for decontamination, disinfection and other treatment of waste water or the like with ultraviolet (UV) radiation from linear flashlamps, linear medium-pressure mercury lamps, and the like comprising:
    a chamber body defining a flow passageway for water or the like under treatment, said chamber body including an inlet port and an outlet port for said water under treatment;
    a plurality of lamp shells formed of a material substantially transparent to UV radiation, said shells extending transversely through said passageway;
    a removable lamp module including a base portion and an array of linear UV lamps on said base portion, said module providing electrical power connections to said lamps and said lamps extending through said lamp shells so as to irradiate the water under treatment in said passageway;
    wherein said lamp module is easily removable from said chamber body in such a way that removal of said lamp module does not affect the flow of waste water or the like through the chamber body; and
    a plurality of flow diverters disposed within said chamber, said flow diverters being structured and arranged to direct the water under treatment from peripheral regions of the chamber passageway and to regions of the passageway proximate to said lamp shells where UV field is higher; and
    a receiving assembly disposed opposite said base portion and structured to receive flexible high voltage connectors of said lamps and provide electrical power connections thereto;
    wherein said base portion and receiving assembly are formed to be in flow communication with said lamp shells to permit circulation of coolant therethrough and about said lamps within said lamp shells to cool said lamps.

2. The processing chamber of claim 1 wherein said lamp shells are of a generally cylindrical shape extending vertically through said passageway generally perpendicular to the general fluid flow direction.

3. The processing chamber of claim 1 wherein said lamp shells are linearly disposed along said passageway in the flow direction of said water under treatment and said array of linear UV lamps is linearly disposed on the base portion of said removable module in registration with said lamp shells.

4. The processing chamber of claim 3 wherein said array of linear UV lamps and said base portion form an integral unit.

5. The processing chamber of claim 3 wherein said lamp shells are disposed along the processing chamber center line with a separation between adjacent lamp centers substantially equal to the distance between said center line and the neighboring chamber sidewall.

6. The processing chamber of claim 2 wherein said flow diverters include a plurality of flow diverters extending substantially parallel to said lamp shells with at least one such parallel flow diverter being shaped and disposed with respect to each shell so as to divert flowing water from a faster flowing portion of the flow to a slower flowing portion of the flow in the vicinity of said shell.

7. The processing chamber of claim 6 wherein said parallel flow diverters are generally rectangular in shape, extending vertically in said passageway, and are positioned in the flow of water at an angle so as to divert a portion of the flow toward the associated lamp shells.

8. The processing chamber of claim 1 wherein one of said flow diverters comprises a generally conical member disposed at said inlet port in said passageway, said conical member being shaped to divert the flow of water to the peripheral regions of said passageway.

9. The processing chamber of claim 1 wherein said receiving assembly is structured to yieldingly secure said lamps therein so as not to subject said lamps to undue mechanical stress from said receiving assembly during operation.

10. The processing chamber of claim 9, each said lamp having an anode end and a cathode end, wherein said lamps are formed to terminate in a flexible wire at the anode end thereof, said wire providing an electrical connection to the anode and said receiving assembly being formed to removably secure said wire to said receiving assembly whereby said lamps are yieldingly secured in said receiving assembly and are demountable therefrom for removing said removable lamp module.

11. The processing chamber of claim 1 wherein said lamps have an individual input power rating in the range of 50 to 300 watts per inch of the lamp's length.

12. The processing chamber of claim 1, further comprising:
- a plurality of buffer tanks for receiving water or the like under treatment, each said buffer tank being in flow communication with said processing chamber inlet and outlet so as to recirculate the water or the like under treatment between said processing chamber and each respective buffer tank;
- a valve system and a pump interposed between said processing chamber and said buffer tanks, said pump having sufficient pumping capacity to circulate the water or the like under treatment between said processing chamber and said buffer tanks at sufficiently high flow rate to prevent fouling of said protective wall in said processing chamber and said valve system being operative to circulate the water or the like under treatment alternately through said processing chamber and said buffer tanks whereby the water under treatment is circulated a plurality of times through said processing chamber and said buffer tanks so as to achieve the necessary UV exposure for the water under treatment notwithstanding the high flow rate.

13. A compact processing chamber for decontamination, disinfection and other treatment of waste water or the like with ultraviolet (UV) radiation comprising:
- a chamber body defining a flow passageway for water or the like under treatment, said chamber body including an inlet port and an outlet port for said water under treatment;
- a plurality of lamp shells formed of a material substantially transparent to UV radiation, said shells extending transversely through said passageway and being linearly disposed along said passageway in the flow direction of said water under treatment;
- a removable lamp module including a base portion and an array of UV lamps linearly disposed on said base portion in registration with said lamp shells, said module providing electrical power connections to said lamps and said lamps extending through said lamp shells so as to irradiate the water under treatment in said passageway;
- wherein said lamp module is easily removable from said chamber body in such a way that removal of said lamp module does not affect the flow of waste water or the like through the chamber body; and
- a plurality of flow diverters disposed within said chamber extending substantially parallel to said lamp shells, said flow diverters being structured and arranged to direct the water under treatment to peripheral regions of the chamber passageway and to regions of the passageway proximate to said lamp shells wherein at least one such parallel flow diverter is shaped and disposed with respect to each shell so as to divert flowing water from a faster flowing portion of the flow to a slower flowing portion of the flow in the vicinity of said shell; and
- a receiving assembly disposed opposite said base portion and structured to receive said lamps and provide electrical power connections thereto;
- wherein said base portion and receiving assembly are formed to be in flow communication with said lamp shells to permit circulation of coolant therethrough and about said lamps within said lamp shells to cool said lamps.

14. A compact processing chamber for decontamination, disinfection and other treatment of waste water or the like with ultraviolet (UV) radiation from linear flashlamps, linear medium-pressure mercury lamps, and the like comprising:
- a chamber body defining a flow passageway for water or the like under treatment, said chamber body including an inlet port and an outlet port for said water under treatment;
- a removable lamp module including a base portion and an array of linear UV lamps on said base portion, said module providing electrical power connections to said lamps;
- wherein said lamp module is easily removable from said chamber body in such a way that removal of said lamp module does not affect the flow of waste water or the like through the chamber body; and
- an enclosed volume for said array of linear UV lamps, said enclosed volume having a protective wall substantially transparent to UV radiation and said wall being disposed to permit UV radiation to pass from said array to said flow passageway, wherein said array of lamps extends into said enclosed volume so as to irradiate the water under treatment in said passageway;
- a plurality of flow diverters disposed within said chamber, said flow diverters being structured and arranged to direct the water under treatment from peripheral regions of the chamber passageway and to regions of the passageway of higher UV intensity proximate to said lamp volume; and a receiving assembly disposed opposite said base portion and structured to receive said lamps and provide electrical power connections thereto;

wherein said base portion and receiving assembly are formed to be in flow communication with said lamp volume to permit circulation of coolant therethrough and about said lamps within said lamp shells to cool said lamps.

15. A compact self-cleaning system for decontamination, disinfection and other treatment of waste water or the like with ultraviolet (UV) radiation from linear flashlamps, linear medium-pressure mercury lamps, and the like comprising:

a processing chamber as defined by claim 14;

a plurality of buffer tanks for receiving water or the like under treatment, each said buffer tank being in flow communication with said processing chamber so as to recirculate the water or the like under treatment between said processing chamber and each respective buffer tank;

a valve system and a pump interposed between said processing chamber and said buffer tanks, said pump having sufficient pumping capacity to circulate the water or the like under treatment between said processing chamber and said buffer tanks at sufficiently high flow rate to prevent fouling of said protective wall in said processing chamber and said valve system being operative to circulate the water or the like under treatment alternately through said processing chamber and said buffer tanks whereby the water under treatment is circulated a plurality of times through said processing chamber and said buffer tanks so as to achieve the necessary UV exposure for the water under treatment notwithstanding the high flow rate.

16. A replaceable UV lamp module for use with a processing chamber for decontamination, disinfection and other treatment of waste water or the like with ultraviolet (UV) radiation, said processing chamber comprising:

a chamber body defining a flow passageway for water or the like under treatment, said chamber body including an inlet port and an outlet port for said water under treatment; and wherein said lamp module is easily removable from said chamber body in such a way that removal of said lamp module does not affect the flow of waste water or the like through the chamber body; and a plurality of lamp shells formed of a material substantially transparent to UV radiation, said shells extending transversely through said passageway;

wherein said replaceable lamp module comprises:

a linear array of UV lamps; and a base portion formed to hold the lamps of said linear array in a disposition aligned with the plurality of lamp shells in said processing chamber, said base portion being further formed to define a flow passageway for coolant, said coolant flow passageway being in flow communication with the region exterior to said lamps and providing a sealing member for each lamp to seal said base portion at each said lamp to the respective shell in said processing chamber.

* * * * *